United States Patent [19]

Klatt et al.

[11] 4,152,588
[45] May 1, 1979

[54] INFRARED SCANNING AND DISPLAY SYSTEM HAVING A NONCONTACTING ANGLE ENCODER

[75] Inventors: Robert W. Klatt; A. Stevens Halsted, both of Rancho Palos Verdes, Calif.

[73] Assignee: Hughes Aircraft Company, Culver City, Calif.

[21] Appl. No.: 846,482

[22] Filed: Oct. 28, 1977

[51] Int. Cl.² .......................................... G01D 5/40
[52] U.S. Cl. .............................. 250/230; 250/237 G; 250/347
[58] Field of Search ............... 250/347, 348, 230, 237; 356/167

[56] References Cited

U.S. PATENT DOCUMENTS

| | | | |
|---|---|---|---|
| 3,068,361 | 12/1962 | Lannan | 250/230 |
| 3,364,813 | 1/1968 | McKinney | 250/230 |

Primary Examiner—John Kominski
Attorney, Agent, or Firm—Kenneth W. Float; W. H. MacAllister

[57] ABSTRACT

A scanning mirror position sensor operable from the back side of a scanning mirror which utilizes the front side of the mirror for scanning a scene to be interrogated or displayed. A rectangular uniformly distributed light source is reflected from the back surface of the scanning mirror across a grating consisting of alternate transparent and opaque regions placed in the focal plane in front of a single large area photodetector. As the light from the light source sweeps across the grating, the detector is alternately energized and deenergized to form a serial pulse train which is coupled to a pulse counter which accumulates the pulse count to thereby provide a continual and accurate measure of the mirror position.

3 Claims, 5 Drawing Figures

INFRARED SCANNING AND DISPLAY SYSTEM HAVING A NONCONTACTING ANGLE ENCODER

BACKGROUND OF THE INVENTION

This invention relates to scanning systems such as infrared scanning systems and particularly to a highly accurate mirror position sensing system.

In sensor systems such as IR (infrared) scanning and display systems in which a moving mirror is utilized to scan a scene being interrogated, the instantaneous position of the mirror is required, for example, to correct the image distortion of the scene and to enhance the picture in the processor. Conventionally, detection of the mirror position requires a highly constant scan mirror velocity, two sensors for forward and backward scanning of the mirror plus considerable electronic circuitry to respond to the sensors. Further, conventional systems are typically unable to totally compensate for variations of mirror speed. A simplified and highly accurate scanning mirror position sensor capable of indicating position despite mirror speed variations would be a substantial advantage to the art. An application describing a mirror position sensing system that operates independent of speed variations in Ser. No. 809,149, "Scan Mirror Position Determining System," by Robert N. Sato, filed June 22, 1977, and assigned to the same assignee as the subject application. This referenced application teaches a system utilizing the back side of the scanning mirror to apply a light beam to a plurality of detectors that are arranged to provide a Gray code.

SUMMARY OF THE INVENTION

The scanning mirror position sensor, in accordance with the invention, is a system consisting of a rectangular or elongated uniformly distributed light source or other suitably shaped light source reflecting from one surface of the scanning mirror to a single large area photodetector through a grating. As the scan mirror rotates forward and backward horizontally, the image scans across the grating which consists of a generally opaque plate having alternate transparent vertical slots. Behind the grating, a large area photodetector is placed so that as a light beam reflected from the back of the scanning mirror sweeps across the grating surface, the photodetector is energized whenever the light beam passes through a transparent region of the grating. Thus, a series of pulses is generated at the output of the photodetector as the light beam sweeps across the grating surface. The grating's transparent regions may have variable widths or spacing to compensate for constant optical or mechanical distortions in the system or to incorporate a code indicating the beginning or end of a scan. A sense amplifier and a transistor logic level shifter is provided to interface directly with processing and display circuitry. The scan velocity and the angular position of the scanning mirror may be accurately determined by monitoring the pulse rate from the photodetector.

It is therefore an object of this invention to provide an improved IR scanning system.

It is therefore an object of this invention to provide an improved IR scanning system. It is a further object of this invention to provide a scanning mirror position subsystem that operates in conjunction with a scene scanning mirror.

It is another object of this invention to provide a system to detect an IR scan mirror position that operates accurately and instantaneously regardless of changes in scan velocity.

It is still another object of this invention to provide a scan mirror position sensor that may be constructed to provide substantially any desired accuracy of position.

BRIEF DESCRIPTION OF THE DRAWINGS

These and other objects, features and advantages of the invention itself, will become apparent to those skilled in the art in the light of the following detailed description taken in conjunction with the accompanying drawings, wherein like reference numerals indicate like corresponding parts throughout the several parts wherein:

FIG. 4 is a voltage versus scan position plot showing a spatial representation of the output from the large area photodetector as the light sweeps across the grating.

FIG. 5 is a voltage versus time plot showing a time domain representation of the output from the large area photodetector as the light sweeps across the grating.

DETAILED DESCRIPTION OF THE INVENTION

Figure 1:
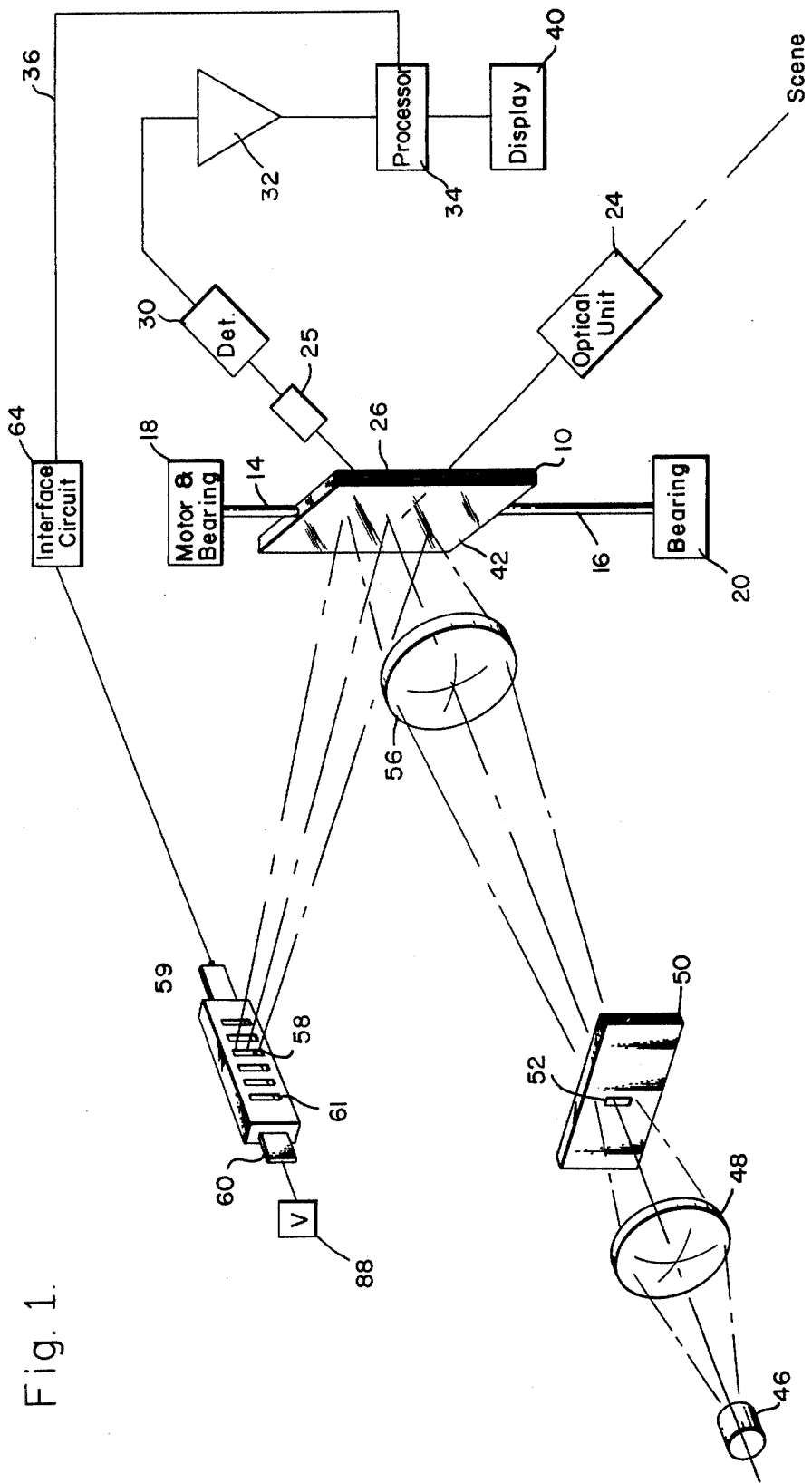
FIG. 1 is a schematic block and structural diagram showing the scan mirror position sensor in accordance with the invention.

Referring first to FIG. 1, a scan mirror 10 has scan axles 14 and 16 which are illustrated respectively coupled to a scan motor and bearing unit 18 and to a bearing 20. The motor of the unit 18 may, for example, rotate the mirror 10 a selected number of degrees back and forth so as to scan a scene on a front side 26 of the mirror 10 through a suitable optical unit 24. The reflected scene image is then applied through a suitable optical unit 25, in some arrangements, to a detector array 30, which may include a plurality of IR detectors. The reflected scene image is then respectively applied to a preamplifier 32 and a processor 34. In order to determine mirror position and to provide image enhancement and to correct for image distortion, a lead 36 provides pulses to the processor 34 which in turn provides imaging data to a utilization unit such as a display 40.

Although the front side 26 of the mirror 10 is utilized for thermal imaging, the back side 42 may be utilized for the position-locating system in accordance with the invention. A light source is provided which may consist of a light emitting diode (LED) 46, a suitable lens or lens unit 48 and a plate 50 with a vertical slit 52 therein to direct a rectangular beam of light through a lens or lens unit 56 to the back surface 42 of the mirror 10. The light beam for the purposes of this invention is understood to include infrared frequencies as illustrated, visible light or energy at any frequency of the spectrum. A uniform rectangular or elongated beam of light 58 is then impinged on an opaque grating 59 and moves therealong as the mirror 10 scans back and forth. The grating 59 has a plurality of spaced transparent slots 61 of selected width and spacing so that a series of pulses is formed by a large area photodetector 60 when the light beam passes across the grating 59. The large area photodetector 60 is disposed behind the grating in the optical path so that as the light beam moves across the grating a pulse is generated each time the light beam passes through a transparent slot. Power is supplied to the large area photodetector 60 by power source 88. The resulting pulse train is applied to an interface circuit 64 which shapes and then transfers the series of pulses through the lead 36 to the processor 34, for example. The circuit 64 may be either incorporated on the same substrate as the large area photodetector or may be a separate structure preferably very close thereto to reduce stray capacitance.

Figure 3:
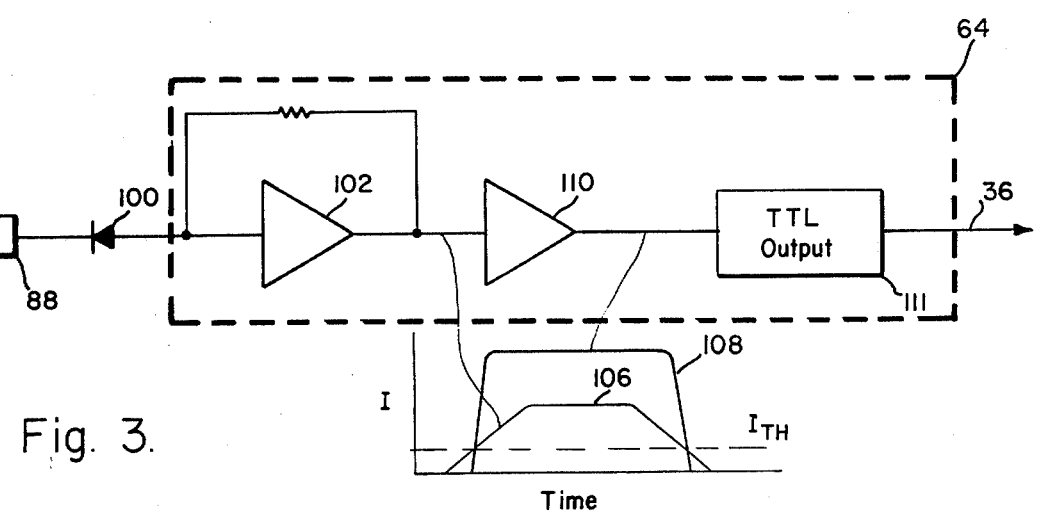
FIG. 3 is a schematic perspective view of a grating and large area photodetector that may be utilized in the system of FIG. 1.

Referring now to FIG. 3, a PN junction diode 100 represents the large area photodetector 60 which applies current to a sense amplifier 102. Power is supplied to the diode 100 from the power source 88. As is well known, the doping utilized in the PN junction causes the diode 100 to be responsive to photons. In order to prevent the photodetector from sensing the presence of light while only partly energizing the P material, for example, at the edge of a grating opening, the PN junction of the diode 100 has a threshold $I_{th}$ which requires a current of a sufficient amplitude to indicate the presence of a signal. For example, a waveform 106 has a current value above $I_{th}$ and a one is detected at the output of a level shifter 110. Only when the P channel passes sufficient current as shown by the waveform 106 so as to exceed $I_{th}$, is a one signal generated by the level shifter 110. The output from the level shifter 110 may be used in serial form or may be transferred to a binary code before being utilized such as in the processor 34. A TTL box 111 (transistor-transistor logic) is shown to illustrate that, for example, in the interface circuit 64 logic may be utilized before being fed into the processor 34 and it can be any logic such as CMOS logic or NMOS logic.

Reliable position information is provided despite changes in the scan mirror velocity utilizing the TTL box 111 or logic in the processor 34 by simply synchronizing the processor pulse repetition frequency as the light passes across the grating. In addition, scan direction information may be obtained so long as the direction of scan does not change between the ends of the grating (i.e. between the end transparent slots in the grating) by detecting either that the pulses have ceased for a defined period of time or by putting a special slot code, e.g. two or three tightly spaced slots, at the beginning or one end and a similar but distinct slot code at the other end of the grating slots. Of course, conventional counter logic may be provided to detect such codes or to detect pauses in the pulse repetition, and to generate the appropriate signal for the processor 34.

Referring now to FIG. 3, a representative grating 59 having transparent slots 61 is shown. Behind the grating 59 in the optical path is a single large area photodetector 60 which generates an electronic pulse, such as that shown in the waveform 106 of FIG. 3, whenever the light bar from the light source passes through one of the transparent slots 61 to energize the detector 60. This result is illustrated in FIG. 4 which shows the spatial voltage output from detector 60 as the light bar passes across grating 59 at a constant rate.

As previously discussed, a start slot code and an end slot code may be provided as shown by slot regions 62 and 63 respectively in the grating 59. Such a code may, for example, be tightly spaced and thus arranged in such a way that the interface circuit 64 or processor 34 of FIG. 1 can detect when the light bar begins a sweep and ends a sweep across the grating 59. Of course, it will be appreciated that in such an arrangement the scanning mirror will not have a scanning acceleration of sufficient magnitude that the pulses formed by the start slot code or end slot code will be confused with pulses generated as the light beam sweeps across the slots 61.

Alternatively, the start slot code and end slot code may be eliminated and the processor arranged to detect, through conventional clocking and logic circuitry, that a pulse from detector 60 has not occurred within a defined period of time thus marking the end or beginning of a sweep across the grating 59.

Referring now to FIG. 5, the output from detector 60 is shown plotted versus time to illustrate that as the scan rate of the scan mirror increases or decreases the pulse repetition frequency will vary. This variation may be utilized by the processor 34 to synchronize and control the clock rate for the various multiplex circuits and other processing and detection circuitry utilized to process the video information sent to display 40 of FIG. 1.

Of course, it will also be appreciated that the width of the particular transparent slots 61 and the spacing between the transparent slots 61 of the grating 59 may be varied to compensate for constant optical distortions or other constant system distortions and thereby improve the accuracy of the scan position sensor of the present invention.

Thus, a scan mirror position sensing system has been described utilizing a single large area photodetector in conjunction with a grating having an arrangement of transparent slots across which a light bar or other suitably shaped light beam moves to generate a serial pulse train which may be utilized to determine the position of the scanning mirror. In this arrangement, the accurate mirror position may be utilized in the processor, for example, to control the servo so as to change the mirror position to compensate for ageing of the servo or may change or indicate to the display a change in the mirror position.

Although the prior description represents a preferred embodiment of the present invention, it will be obvious to those skilled in the art that changes and modifications may be made without departing from the invention in its broader aspects and therefore the aim of the appended claims is to cover all such changes and modifications as follow in the true spirit and scope of the invention.

What is claimed is:

1. An infrared scanning and display system comprising:
   first detection means for converting applied infrared energy into electrical signals;
   a scanning mirror having a first surface disposed to receive infrared energy from an image scene and for applying said infrared energy to said first detection means;
   a light beam generating source positioned to transmit light energy to a second surface of said scanning mirror;
   a grating comprised of a plurality of transparent slots, said grating being positioned so that the light energy reflected from said second surface of said scanning mirror is scanned across said grating, as said scanning mirror changes angular position relative to said light source;
   second detection means positioned behind said grating for receiving light energy passing through said grating and for producing a serial train of pulses in response to said light energy, said train of pulses being indicative of the angular position of said scanning mirror;

processor means coupled to said first detection means and said second detection means for receiving and processing said electrical signals and said train of pulses so as to produce imaging data; and a display unit coupled to said processor means for utilizing said imaging data.

2. The infrared scanning and display system of claim 1, wherein said second detection means includes a photodetector and an interface circuit for shaping said pulses.

3. The infrared scanning and display system of claim 2, wherein said interface circuit includes a threshold circuit for applying to said processor means only those pulses from said second detection means which exceed a threshold level.

* * * * *

UNITED STATES PATENT AND TRADEMARK OFFICE
CERTIFICATE OF CORRECTION

PATENT NO. : 4,152,588
DATED : May 1, 1979
INVENTOR(S) : R. W. KLATT ET AL

Figure 2A:
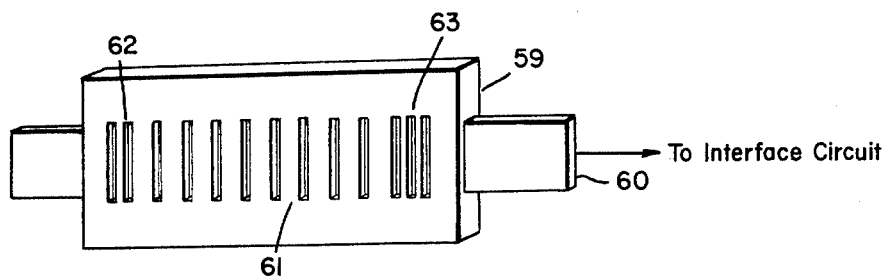
FIG. 2 is a schematic block and circuit diagram illustrating an output circuit that may be utilized for a PN junction-type large area photodetector.
Figure 2B:
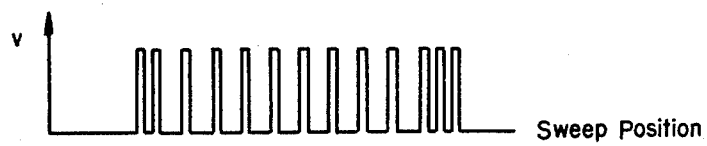
Figure 2C:

It is certified that error appears in the above-identified patent and that said Letters Patent are hereby corrected as shown below:

In the drawings, sheet 2 of 2, the labels should read FIG. 3, FIG, 4, FIG, 5 and FIG. 2 instead of FIG. 2a, FIG. 2b, FIG. 2c and FIG. 3.

Column 1, the following paragraph should be inserted after the heading BACKGROUND OF THE INVENTION:

"The invention herein described was made in the course of or under a contract or subcontract thereunder with the Department of the Army."

Signed and Sealed this

Fourteenth Day of August 1979

[SEAL]

Attest:

*Attesting Officer*

LUTRELLE F. PARKER
*Acting Commissioner of Patents and Trademarks*